May 28, 1935.　　　F. A. BALDWIN　　　2,003,169
ARMATURE WINDING MACHINE
Filed Oct. 9, 1934　　　4 Sheets-Sheet 1

INVENTOR-
Frank A. Baldwin
BY
Edward S. Higgins
ATTORNEY-

May 28, 1935.  F. A. BALDWIN  2,003,169
ARMATURE WINDING MACHINE
Filed Oct. 9, 1934  4 Sheets-Sheet 2
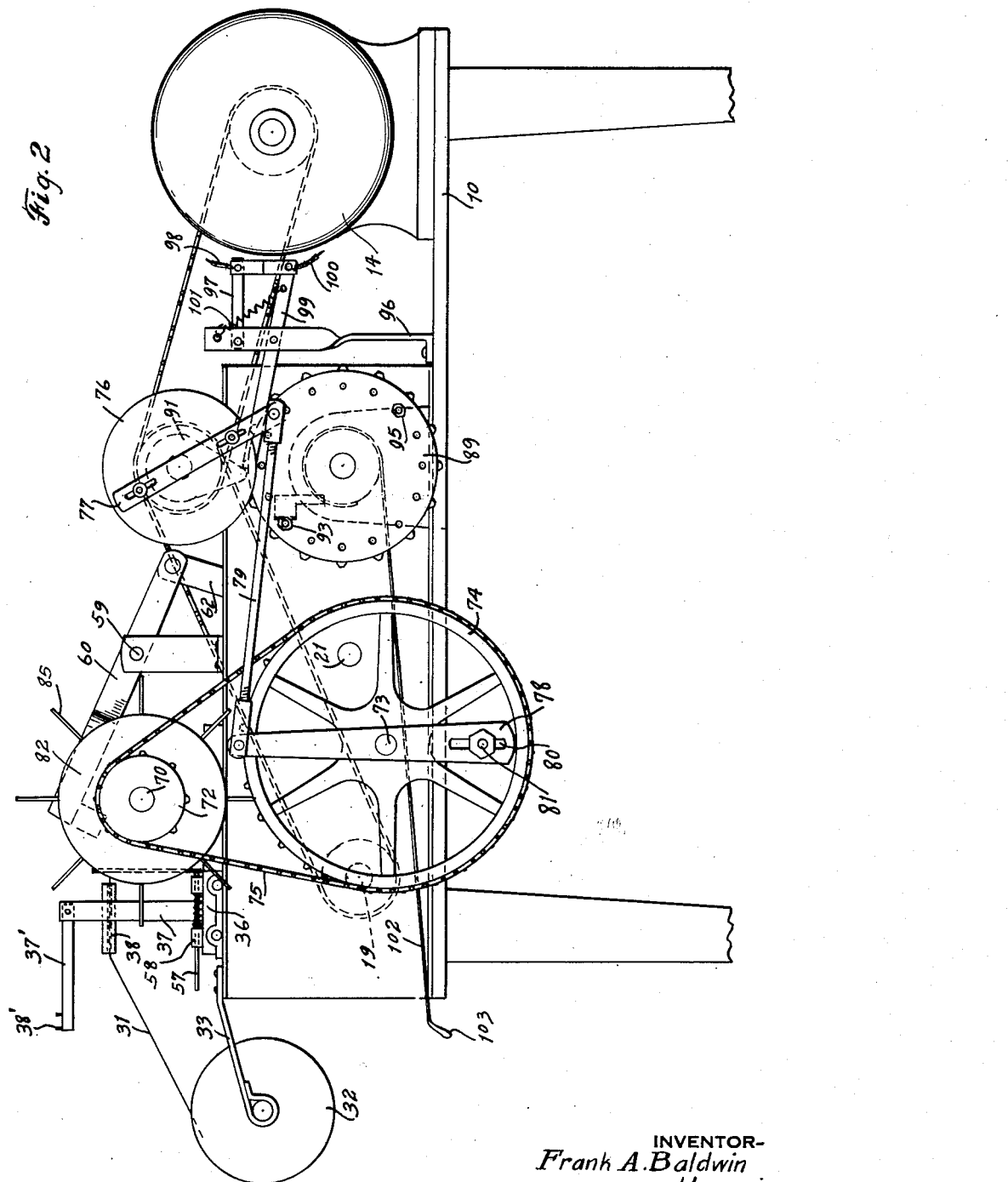
INVENTOR-
Frank A. Baldwin
BY
Edward S. Higgins
ATTORNEY-

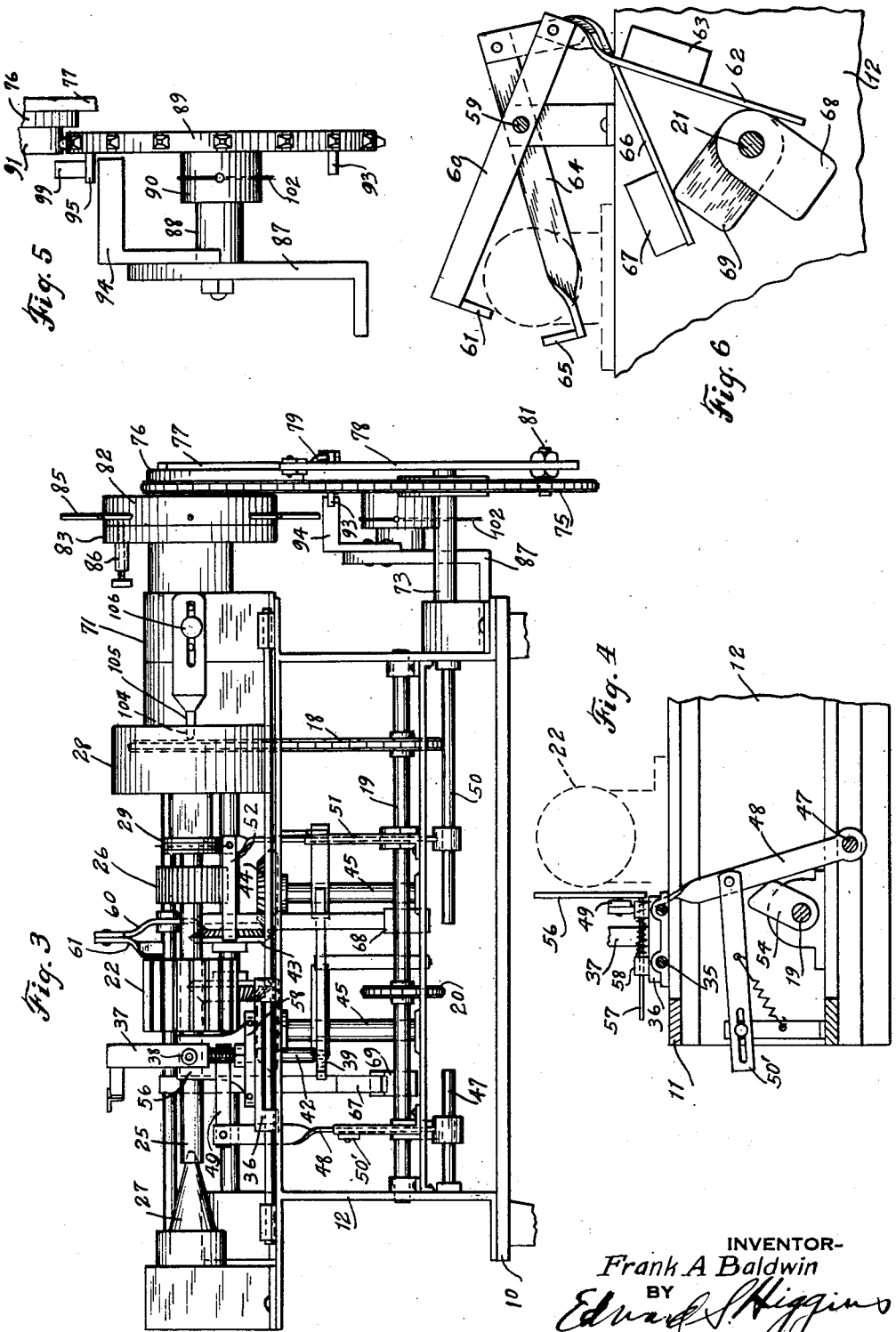

May 28, 1935.　　　F. A. BALDWIN　　　2,003,169
ARMATURE WINDING MACHINE
Filed Oct. 9, 1934　　　4 Sheets-Sheet 4
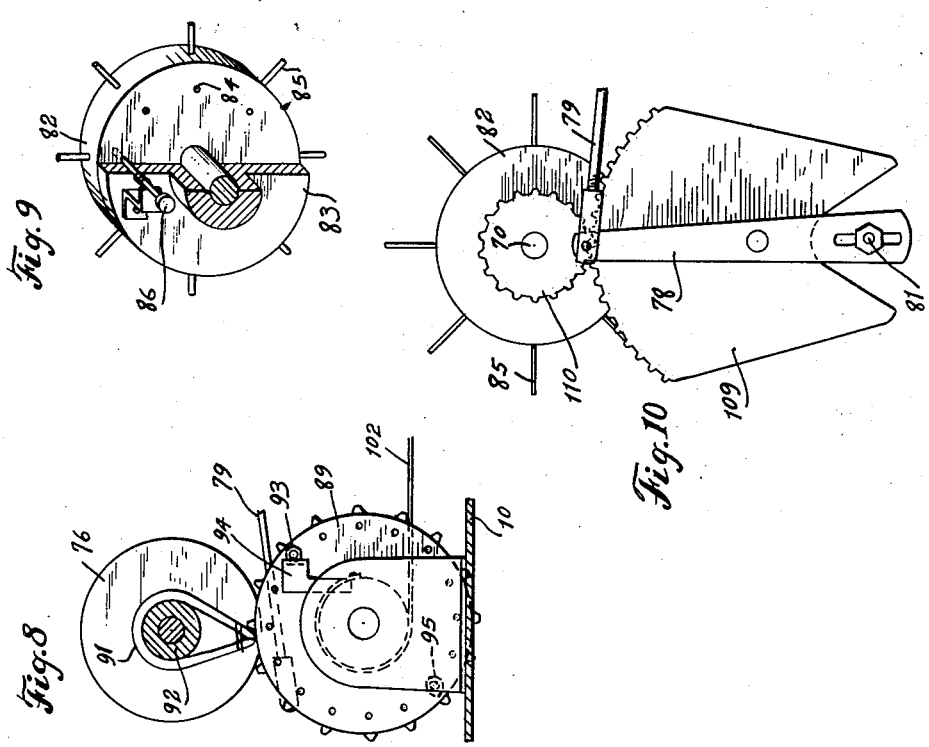
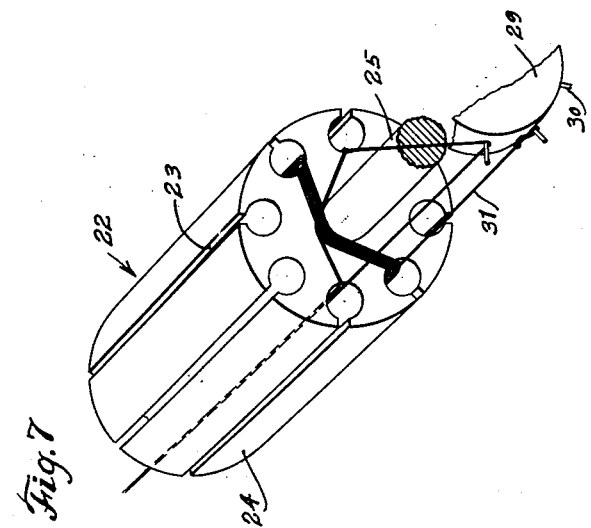
INVENTOR-
*Frank A. Baldwin*
BY
*Edward S. Higgins*
ATTORNEY- Patented May 28, 1935

2,003,169

UNITED STATES PATENT OFFICE 2,003,169

ARMATURE WINDING MACHINE

Frank A. Baldwin, Yonkers, N. Y.

Application October 9, 1934, Serial No. 747,512

7 Claims. (Cl. 242—13)

This invention relates to armature winding machines.

A primary object is the provision of means for guiding the wire to the armature.

Another object is to provide means for keeping the wire from moving out of the armature slots.

Another object is to provide means to guide or position the armature core in proper position for wiring.

A further object is to provide means for indexing the armature to bring the proper slots in the core into line with the wire.

A still further object is to provide a machine of this kind that is simple in construction and economical to manufacture and is positive in action.

Other objects and advantages of the improved machine will be apparent from the description thereof to follow taken in connection with the accompanying drawings, in which—

Figure 2 is a side view thereof.

Figure 3 is a front view with the wire spool removed.

Figure 4 is a detail of the wire guiding and inserting mechanism.

Figure 5 is a detail of the switch mechanism for breaking the circuit, and of the resetting mechanism.

Figure 6 is a detail view of the mechanism for keeping the wire aligned with the slots in the armature.

Figure 7 is a perspective view of an armature core with wires wound in the slots.

Figure 8 is a detail view showing part of the armature moving mechanism and circuit breaking mechanism.

Figure 9 is a detail view showing part of the armature indexing mechanism.

Figure 10 is a detail view of a modified form of armature rotating mechanism.

Figure 1:
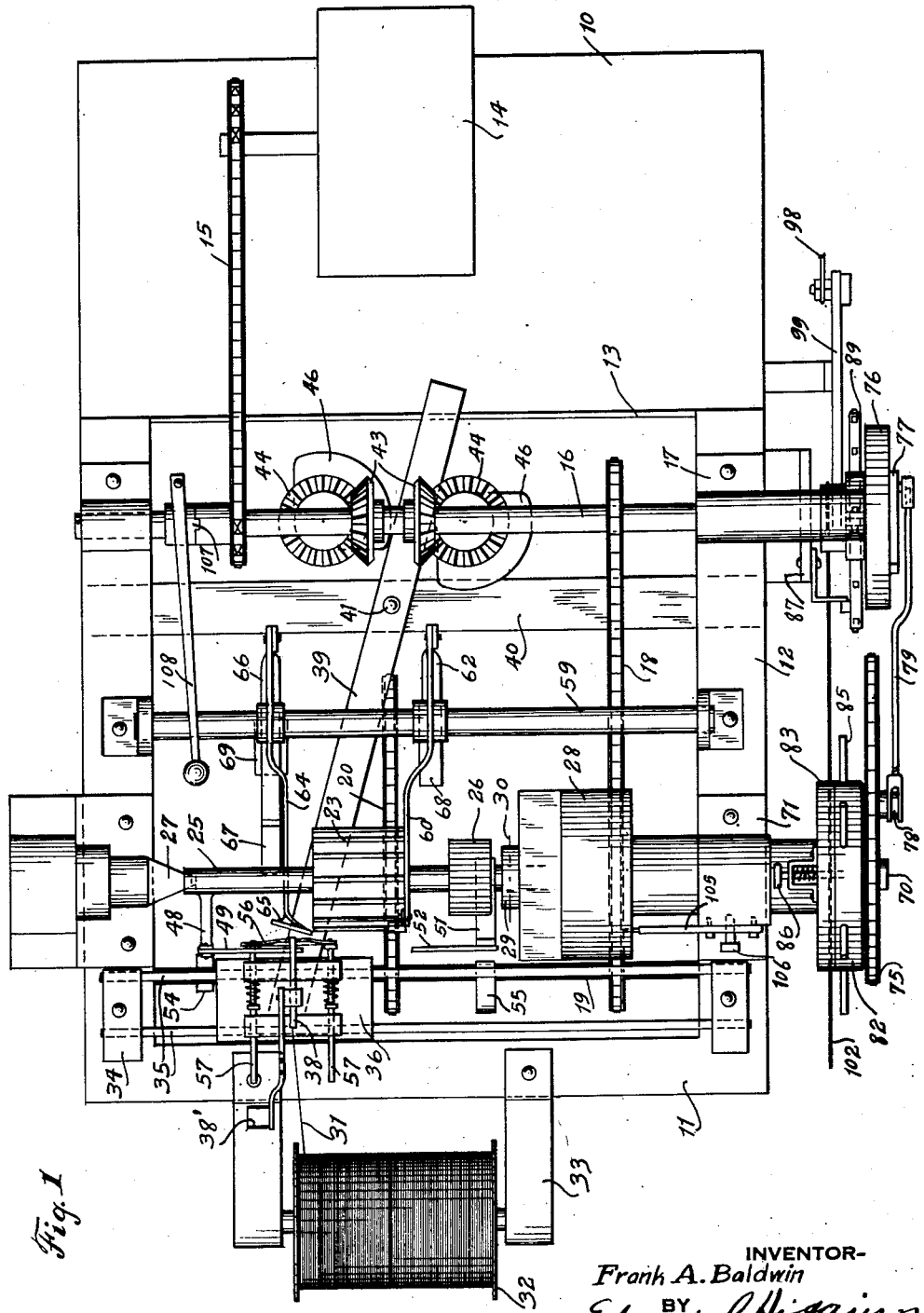
Figure 1 is a top plan view of the improved machine.

Referring to the drawings, the improved armature winding machine may be mounted on a table 10 or other suitable support. Its frame consists of front beam 11, side beams 12 and rear beam 13, the side beams being preferably channel irons.

Driving mechanism

The machine is preferably operated by an electric motor 14. The drive may be taken from the motor shaft by chain 15 or other flexible member. This chain drives a shaft 16 mounted in bearings 17 on the side beams, at the rear of the machine. The shaft 16 by means of a chain 18 drives another shaft 19 positioned at the front of the frame, and this shaft 19 through a chain 20 drives another shaft 21 positioned at the bottom of the frame intermediate the ends thereof.

Armature positioning mechanism

The armature to be wound, comprising a core 22, with spaced slots 23 and segments 24 therebetween, and a shaft 25 mounting a commutator 26 positioned on one end, has one end of its shaft 25 mounted for rotation on a pointed bearing member 27 and its other end adapted to be secured between the jaws of a chuck 28. The shaft 25 carries a collar 29, with pins 30 protruding therefrom, on its end adjacent the commutator. The chuck member 28 is of ordinary construction and its jaws may be clamped on the armature shaft or released therefrom by a tool in the usual manner.

Wire feeding and guiding mechanism

The wire 31 to be wound on the armature is supplied from a spool 32 mounted on brackets 33 on the front beam 11 of the frame. Mounted adjacent the front beam 11 in bearings 34 on the side beams 12 are a pair of rails 35. On these rails 35 is a slide carriage 36. This carriage as best seen in Fig. 2 supports an upright bracket member 37, and mounted at a point intermediate its ends is a tubular wire guide member 38. This tubular member 38 is directly in line with the slot 23 of the armature to be wound.

An arm 37' is hinged to the top of the bracket 37 for guiding the armature core in proper position by means of spaced flanges 38' carried at its end. The arm 37' with its flanges 38' is moved away after initially positioning the core.

The slide 36 is moved along the rails by means of a lever 39 which extends from the rear to the front of the frame. This lever 39 is pivotally mounted on a transverse beam 40 by means of a fulcrum pin 41. Its front end engages a downwardly extending stud 42 on the slide 36 (see Fig. 3). The lever 39 is actuated from the drive shaft 16 by means of pinions 43 mounted thereon which mesh with gears 44 on upright stub shafts 45. Each of these upright shafts 45 mounts a cam 46. These cams are so mounted on the shafts 45 that their operating faces are positioned at an angle to each other, and wipe over opposite edges of the lever 39.

On a stub shaft 47 positioned directly below the armature shaft 25 to one side of the frame is pivotally mounted a rocker arm 48 carrying a finger piece 49 at its extreme free end; and on a similar stub shaft 50 at the opposite side is a similar rocker arm 51 with a finger 52. Each of the rocker arms 48 and 51 is connected to a spring pressed lever 50' for resetting same to normal position.

Mounted on the rotatable shaft 19 in front of the rocker arm 48, on the stub shaft 47, and adapted to engage said arm is a cam 54; and a similar cam 55 is mounted in front of the rocker arm 51 for engagement therewith.

The sliding carriage 36 has a movable wire pusher member comprising an upright member 56 mounted on a pair of spring pressed plungers 57 horizontally and slidably mounted in bearings 58 on the carriage. When the carriage moves to its farthest point on one side of the frame the upright pusher member 56 is positioned behind said finger 49 (see Fig. 1) and is adapted to be engaged thereby, and when the carriage is moved to its farthest point on the opposite side, the upright pusher member is positioned behind the other finger member 52 and is adapted to be moved or pushed thereby.

Intermediate the frame and on the top thereof and behind the armature is a shaft 59 and rockingly mounted on this shaft at a point near one side of the armature core is a bell crank rocker arm having one arm 60 extending forwardly and carrying a finger piece 61 at its extreme end, and its other arm 62 extending downwardly and mounting a weight 63. The arm 60 when rocked downwardly is adapted to bring the finger piece 61 close to the end of the slot in the armature core that is being wired. On the same shaft 59 at a point near the opposite side of the armature core is another bell crank rocker arm having one arm 64 extending forwardly to the armature core and carrying a finger piece 65 at its extreme end, and its other arm 66 extending downwardly and forwardly and mounting a weight 67. The arm 64 when rocked upwardly is adapted to bring the finger piece 65 close to the opposite end of the slot in the armature core that is being wired.

On the shaft 21 which is directly under the shaft 59 is a cam 68 positioned adjacent to the downwardly extending arm 62 which is adapted to be moved thereby. Another cam 69 is mounted on the shaft 21 adjacent to the downwardly extending arm 66 in position to move the same.

Armature rotating mechanism

The armature must be partially rotated after each travel of the carriage 36. The mechanism for doing this includes a shaft 70 mounted in a bearing 71 near the front of the frame in line with the pointed bearing member 27. One end of the chuck 28 is mounted on the inner end of this shaft 70. On the outer end of this shaft 70 outside of the frame is a toothed wheel 72. Loosely mounted on a stub shaft 73 below the shaft 70 is a sprocket wheel 74. The toothed wheel 72 and sprocket wheel 74 are on the same vertical plane and are connected by a chain 75.

Secured to the outer end of the drive shaft 16 outside of the frame is a disc 76 and adjustably mounted on said disc 76 is a lever 77. On the outer end of the shaft 73 and positioned close to the sprocket wheel 74 is a lever 78. To one end of the lever 78 is fastened one end of a tie rod 79, the other end of which rod is fast to one end of the lever 77. Mounted in a slot 80 in the other free end of the lever 78 is a pin or bolt 81. The free end of this pin 81 extends into the space between the spokes and is adapted to engage the spokes when the lever 78 is rocked.

Indexing mechanism

After a plurality of turns have been wound to form one coil, the armature is indexed so as to bring the next adjacent set of slots in proper position to receive the wire for winding the next coil. To accomplish this a disc 82 is fastened to the shaft 70 near its outer end, and mounted loosely on the same shaft is another disc 83, the face of the disc 83 being in sliding contact with the face of disc 82. The disc 82 is provided with a series of spaced openings 84, equal in number to the number of slots 23 in the armature core. This disc 82 is also provided with studs 85 for the purpose of turning the disc. The disc 83 mounts a spring pressed pin or bolt 86 which passes through said disc 83 and is adapted to be pressed into one of the openings 84 in disc 82 in order to hold the two discs fast to each other. The openings 84 in the disc 82 are adapted to be aligned with the slots 23 in the armature core.

Journalled in a bracket 87 on one side of the frame is a stub shaft 88 and mounted on the outer end of this shaft 88 is a toothed wheel 89 provided with an inner hub portion 90. The periphery of this wheel 89 is directly below and in line with a strap 91 secured to the hub 92 of the disc 76. Upon rotation of the disc 76 this strap 91 is adapted to engage one of the teeth of the wheel 89 and rotate it one notch. Carried on the inner face of the wheel 89 near the periphery thereof and extending inwardly thereof is a stop pin 93 which is adapted to engage a stop member 94 mounted on the bracket 87 and to prevent further backward rotation of the wheel 89 upon resetting. Another pin 95 is carried by the wheel 89 on the inner face thereof at a point opposite to the stop pin 93. The pin 95 is for the purpose of breaking the circuit hereinafter to be described.

Circuit opening and closing mechanism

On a bracket 96 (see Fig. 2) mounted adjacent the toothed wheel 89 is a stationary switch member 97 to which is electrically connected one end of a conductor 98 which leads to the motor 14. Pivotally mounted on the bracket 96 is a bar 99 forming the movable member of the switch. A conductor 100 has one end connected to this bar 99 and its other end to the motor. A spring 101 normally keeps the movable bar in contact with the stationary member 97 to close the circuit. The bar 99 extends forwardly of the frame and its forward end is in line with the pin 95 on the inner face of the toothed wheel 89. When this pin 95 engages the forward end of the bar 99 it lifts it upward and the rear end thereof moves downwardly separating the switch members and opening the circuit.

A chain or flexible member 102 has one end circled around the hub 90 and made fast thereto. This member 102 extends forwardly of the frame to the front thereof and has a handle 103 on its free forward end. In order to restore the switch members to closed circuit position, the flexible member 102 is pulled so as to turn the toothed wheel backward to free the pin 95 from the bar 99, permitting the spring 101 to pull the movable switch member 99 into contact with the stationary member 97. The pin 93 engages stop 94 preventing further movement of the wheel.

Operation of the machine

In operation, the armature core 22 is mounted on the machine by mounting one end of its shaft on the pointed bearing member 27 and its other end in the loose jaws of the chuck 28. The hinged guide arm 37' is then swung over the core so that the spaced flanges 38' thereof fit into two adjacent slots 23 of the core. When the flanges are thus fitted into the slots 23 the core is in proper position for wiring. The chuck 28 is then turned slightly or adjusted so that an opening 104 in the outer face of the chuck is in line with the slot that is to be wired. A pin 105 slidably mounted on the frame and adapted to be moved by a knob 106 is then slid into said opening 104 to hold the chuck in alignment. The jaws of the chuck are then tightened by a tool in the usual manner. The disc 82 of the indexing mechanism is next adjusted or turned so that one of its openings 84 registers with the opening in the disc 83 so that the spring pressed pin 86 may be pressed into said openings to hold the two discs fast. When the two discs are so held one of the openings 84 in the disc 82 will be aligned with the working slot in the armature core.

The motor 14 is started and the power therefrom is brought to the drive shaft 16 through the chain 15 and sliding clutch 107 operated by a handle 108. The shaft 16 through the intermeshing pinions 43 and gears 44 drives the cams 46 which alternately move the lever 39 from side to side.

The forward end of the lever 39 is operatively connected to the carriage 36 and slides the same along the rails 35. The wire 31 is passed through the tubular guide 38 which is in alignment with the slot 23 to be wired in the armature core, the free introductory end of the wire having first been made fast by hand to one of the pins 30 on the collar 29. The carriage 36 by means of the tubular guide 38 carries the wire along the slot in back of the guide and when it is carried to the extreme end of the slot, for example, the right hand end as viewed in Fig. 1, the cam 55 on the shaft 19, which is moved by the chain 18, will have been rocked so that its working face will slide across the lever arm 51, which at this time has its finger 52 positioned behind the pusher member 56, and cause said finger 52 to move said pusher member 56 toward the armature core and force the wire deep into the slot thereof. At the same time the lever arm 60 is rocked downwardly by the cam 68 on shaft 21 so that its finger 61 prevents the looped wire from spreading above the slot or to one side of the core. When the wire is carried to the opposite side of the core, the cam 54 moves the lever arm 48 with its finger 49, forcing the wire into said slot at such side. Simultaneously the lever arm 64 is rocked upwardly so that its finger 65 prevents such spreading below the slot and to the other side thereof. The arm 64 is rocked by the cam 69 on shaft 21. The various cams have their working faces so positioned on the shaft that they work at time intervals. The weights on the levers 60 and 64 return them to normal position.

After the wire has been carried along the slot from end to end, the armature core is flopped or turned 160 degrees so that the slot on the opposite side is presented for wiring in order to complete one loop of wire. This turning movement is accomplished by means of the drive shaft 16 moving the lever 77, which in turn pulls and pushes the lever 78 by means of the rod 79. When the lever 78 is pushed one way its protruding pin 81 pushes the spoke of the sprocket wheel thus turning it in one direction, and when it is pulled the other way its pin strikes the adjacent spoke of the wheel turning it the opposite way. The sprocket wheel 74 drives the toothed wheel 72 by means of the chain 75. The toothed wheel 72 is fast on shaft 70 and thus rotates the armature core 22, which is also fast to the shaft 70, first one way and then the opposite way. This turning movement takes place at the end of each travel of the carriage 36. While the carriage is travelling across the face of the armature core the pin 81 on the lever 78 is travelling between the adjacent spokes and accomplishes no work as is obvious.

When the opposite slots that are being wired have the required number of loops of wire therein, say for instance eight loops, the protruding wire is crossed over the commutator 26 by hand and looped around one of the pins 30 of the collar 29 as shown in Fig. 7.

The pin 95 on the toothed wheel 89 is so positioned that the disc 76 will have rotated the necessary number of times, say eight times for eight loops, to bring said pin around to strike the movable member 99 of the switch and open the circuit to stop the machine.

The indexing disc 82 is then adjusted or turned by means of the studs 85, the pin 86 having first been retracted, so that a different opening 84 in the disc 82 aligns with the opening in the disc 83 when the pin is again pressed into the aligned openings. By means of this adjustment a different set of oppositely disposed slots 23 of the armature core is presented to the tubular guide 38 for wiring. The flexible member or chain 102 is then pulled by means of the handle 103 in order to rotate the toothed wheel 89 backward to carry the switch breaking pin 95 away from the movable switch member 99 and permit the spring 101 to pull said switch member 99 into contact with the stationary member 97 and close the circuit and start the machine up again. The cycle of movements is then repeated.

When all of the slots in the armature core have been sufficiently wired, the core is taken off and the protruding ends of the wire are soldered or otherwise suitably secured in the slots of the commutator 26 in the ordinary manner.

In order to wind armature cores having different numbers of slots, the disc 82 is removed and replaced by a disc having openings similar in number to the number of slots in the core. The stroke of the lever 78 and rod 79 is then made longer or shorter as is necessary by sliding the pin 81 further down or up in the slot 80 so that the travel between the spokes of wheel 74 is longer or shorter as desired. The length of the stroke may also be adjusted by means of the pin and slot connection of lever 77.

For winding a different number of loops or turns of wire in the opposite slots 23, the pin 95 on the toothed wheel is positioned so that the disc 76 will turn a number of times equal to the number of loops desired, before said pin strikes the movable switch member 99 to break the circuit.

Figure 10 illustrates a modified form of drive for turning the armature core, showing a gear segment 109 instead of the sprocket wheel shown in the other form. The teeth of the gear segment meshes with a gear 110 fast on the shaft 70 which mounts the armature core and associated parts. The gear segment is moved by the pin 81 carried by the lever 78.

Other changes in details might be resorted to without departing from the principle of the invention and it is desired to be limited only by the appended claims and the state of the prior art.

I claim:

1. In an armature winding machine, means for rotatably supporting an armature core, means for feeding wire to a core slot and means for automatically turning the armature core, said turning means including a drive shaft, a sprocket wheel, means of connection between the sprocket wheel and armature core and a lever operatively connected to the drive shaft and sprocket wheel for moving the wheel.

2. In an armature winding machine, means for rotatably supporting an armature core; means for feeding wire to a core slot, said feeding means including a slidable carriage, a device for moving said carriage and a tubular member carried by the carriage for guiding the wire to the core slot; and means for automatically turning the armature core including a drive shaft, a sprocket wheel, means of connection between the sprocket wheel and armature core and a lever operatively connected to the drive shaft and sprocket wheel for moving the wheel.

3. In an armature winding machine, means for rotatably supporting an armature core, means for feeding wire to a core slot, means for preventing wire from spreading out of the core slot when feeding, said means including rockable levers at the ends of the slot with fingers adapted to be moved adjacent the slot, one of said fingers being above and the other below the center line of the core and means for automatically turning the armature core.

4. In an armature winding machine, a frame, means for supporting an armature core, means for feeding wire to the core slots, and means for initially positioning said armature core to properly align a slot thereof with said feeding means, said positioning means including a hinged member mounted on a portion of the frame remote from the supporting means and being provided with spaced flanges adapted to engage a pair of adjacent slots of the core.

5. In an armature winding machine, a frame, bearings on the frame for rotatably supporting an armature core, a supply of wire, a slidable carriage for carrying the wire along a slot in the core, a drive shaft, a lever pivotally supported on a portion of said frame and operatively connected to said drive shaft, means of connection between said lever and slidable carriage for moving the latter, a toothed wheel connected to said core bearings, a sprocket wheel connected to said toothed wheel, and a lever operatively connected to said drive shaft and movable between a pair of adjacent spokes of said sprocket wheel while the carriage is sliding along the core slot and being adapted to strike one of said spokes at the end of the travel of said carriage for rotating said armature core.

6. In an armature winding machine, a frame, means for rotatably supporting an armature core, means for feeding and guiding a supply of wire to a slot of said armature core, and means for rotating said armature core, said feeding and guiding means including a drive shaft on the frame, a supply of wire, a pair of spaced rails on the frame, a carriage slidable along said rails, a lever operatively connected to said drive shaft and carriage for moving the latter, a tubular member carried by the carriage for guiding the wire to the core slot, a pair of spring pressed plungers mounted on the carriage and adapted to force the wire into the slot at the end of each travel of the carriage and a rockable lever arm at each end of the core for moving said plunger toward the core, and cam members operatively connected to the drive shaft for rocking said lever arms.

7. In an armature winding machine, means for rotatably supporting an armature core, means for feeding wire to a core slot including a traveling carriage, means for forcing said wire into the bottom of said slot including a pair of plungers on said carriage, said plungers being operable alternately, means for preventing the wire from spreading out of the core slot when feeding including a rockable lever at each end of the slot each lever having a finger adapted to yieldingly engage the coil and means for automatically turning the armature core.

FRANK A. BALDWIN.